(12) United States Patent
Bernhard

(10) Patent No.: US 7,415,816 B2
(45) Date of Patent: Aug. 26, 2008

(54) BEVERAGE BOTTLING PLANT HAVING A BEVERAGE BOTTLE CLOSING MACHINE WITH A BEARING SYSTEM TO GUIDE A RECIPROCATING SHAFT IN THE BEVERAGE BOTTLE CLOSING MACHINE

(75) Inventor: Herbert Bernhard, Wolfsheim (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 0 days.

(21) Appl. No.: 11/436,992

(22) Filed: May 18, 2006

(65) Prior Publication Data

US 2007/0000207 A1    Jan. 4, 2007

(30) Foreign Application Priority Data

May 18, 2005    (DE)    ........................ 10 2005 023 575

(51) Int. Cl.
    *B65B 7/28*    (2006.01)
(52) U.S. Cl. .............................. 53/490; 53/167; 53/317; 53/331.5
(58) Field of Classification Search .................... 384/29, 384/42, 276, 283, 291, 296, 906; 53/167, 53/317, 322, 331.5, 485, 490
    See application file for complete search history.

(56) References Cited

U.S. PATENT DOCUMENTS

| | | | | |
|---|---|---|---|---|
| 1,156,582 A | * | 10/1915 | Biggar ........................ 384/296 |
| 1,460,515 A | * | 7/1923 | Selker ......................... 384/276 |
| 1,731,790 A | * | 10/1929 | Payne .......................... 384/292 |
| 2,931,412 A | | 4/1960 | Wing |
| 3,704,922 A | * | 12/1972 | Kleinschmidt et al. ...... 384/582 |
| 4,208,075 A | * | 6/1980 | Templeton .................... 384/29 |
| 4,215,713 A | * | 8/1980 | Kuhlmann ................... 137/238 |
| 4,693,617 A | * | 9/1987 | Roemer et al. .............. 384/286 |
| 5,216,928 A | * | 6/1993 | Kodachi ...................... 384/296 |
| 5,383,811 A | * | 1/1995 | Campbell et al. ............. 384/42 |
| 5,492,415 A | * | 2/1996 | Jordens et al. .............. 384/296 |
| 5,611,628 A | | 3/1997 | Brouwer |
| 5,836,699 A | | 11/1998 | Back et al. |
| 6,113,275 A | * | 9/2000 | Blase ......................... 384/296 |
| 2004/0057643 A1 | | 3/2004 | Blanchard et al. |

FOREIGN PATENT DOCUMENTS

| | | |
|---|---|---|
| CH | 492 140 | 7/1970 |
| DE | 596173 | 4/1934 |
| DE | 2356817 | 2/1975 |
| DE | 2347548 | 3/1975 |
| DE | 3021533 A1 | 12/1981 |
| DE | 8619907.2 | 10/1986 |
| DE | 3743086 A1 | 6/1989 |
| DE | 19526497 A1 | 6/1996 |
| DE | 10124831 A1 | 11/2002 |

(Continued)

*Primary Examiner*—Louis Huynh
(74) *Attorney, Agent, or Firm*—Nils H. Ljungman & Associates

(57) ABSTRACT

A container filling plant having a container closing machine with a bearing system to guide a reciprocating shaft in the container closing machine. The bearing system is designed to be cleaned to minimize the presence of contaminants in the bearing system and in the product in the containers to be closed.

20 Claims, 4 Drawing Sheets

FOREIGN PATENT DOCUMENTS

| | | |
|---|---|---|
| DE | 10332390 A1 | 2/2005 |
| EP | 0141003 | 5/1985 |
| FR | 1310614 | 10/1962 |
| GB | 1174660 | 12/1969 |
| JP | 6113019 | 4/1994 |

* cited by examiner

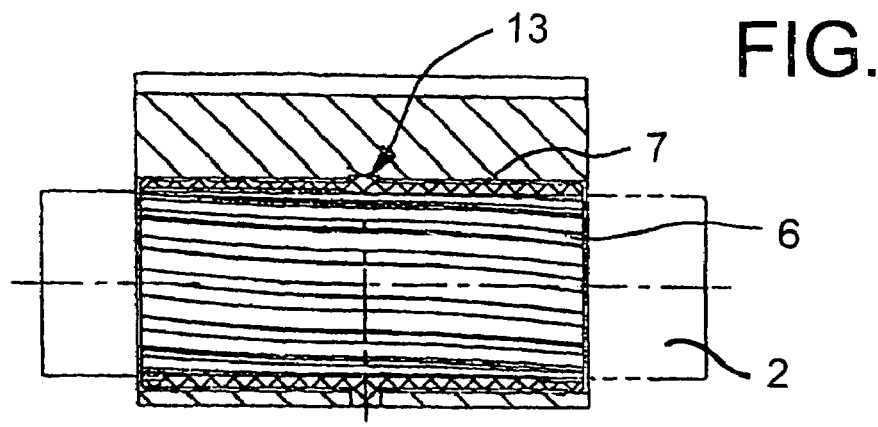
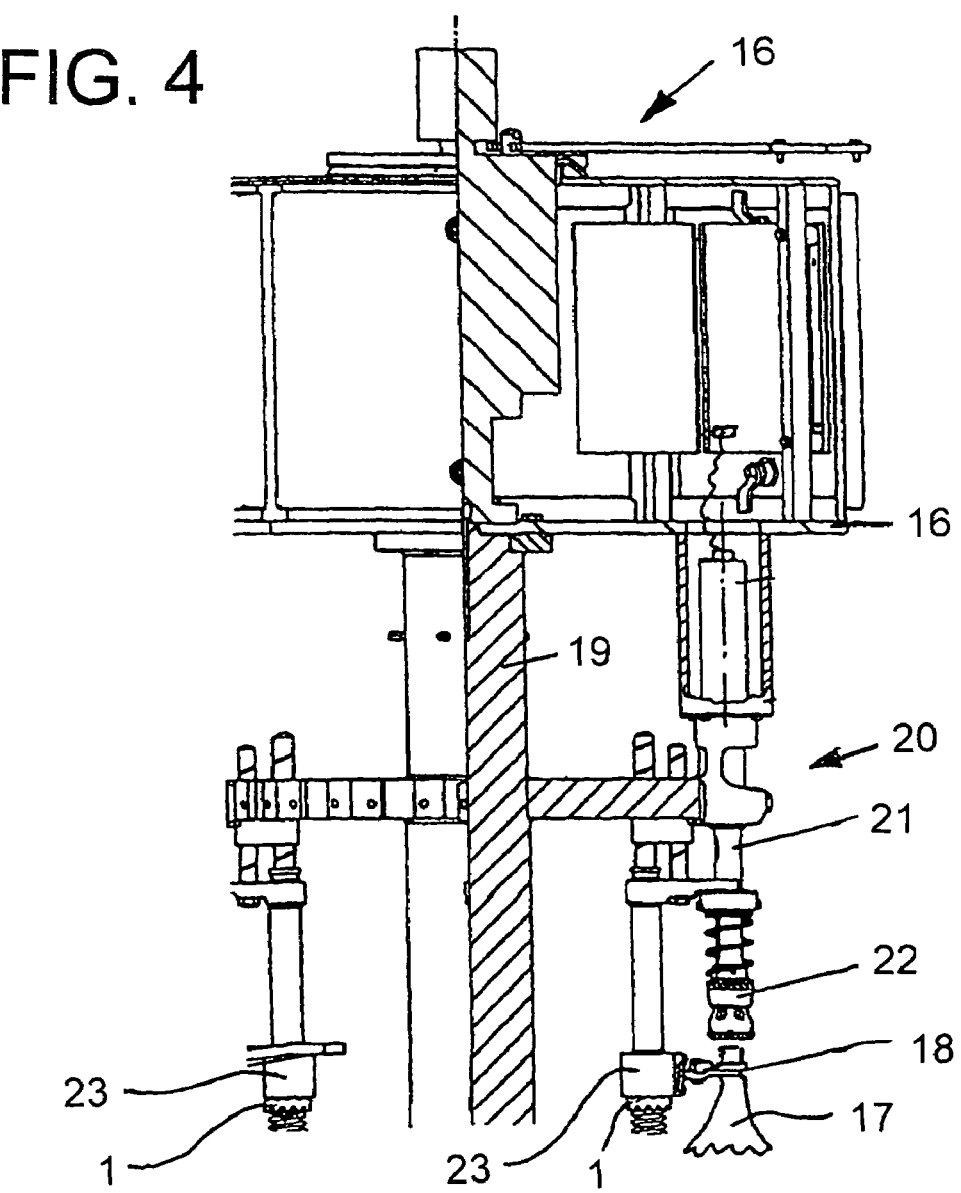

BEVERAGE BOTTLING PLANT HAVING A BEVERAGE BOTTLE CLOSING MACHINE WITH A BEARING SYSTEM TO GUIDE A RECIPROCATING SHAFT IN THE BEVERAGE BOTTLE CLOSING MACHINE

BACKGROUND

1. Technical Field

This application relates to a beverage bottling plant having a beverage bottle closing machine with a bearing system to guide a reciprocating shaft in the beverage bottle closing machine.

This application further relates to a bearing system for the bearing of a shaft with a bearing bushing or sleeve that can be introduced into a receptacle boring of a machine or sliding component, support bearing and similar components, whereby recesses are provided at least in the receptacle boring for the feed and discharge of media.

2. Background Information

In the food or beverage packaging industry, such as beverage bottling, it is very important to take steps to minimize the contamination of the food or beverage during the packaging process. For example, in the bottling of beverages, it is very important to keep the machinery of the beverage bottling plant as clean and free from contaminants as possible. During the bottling process, it is not uncommon for the amounts of the beverage being filled into the bottles to splash or foam or otherwise be deposited on the surfaces of the machinery. Such amounts of beverage can cause the machinery to become dirty or sticky and possibly result in the production of contaminants that could contaminate the beverage in the bottles, thereby rendering the beverage undesirable or even unsafe for consumption. In addition, naturally occurring amounts of dust and dirt in the beverage bottling plant environment can be deposited and accumulate on the beverage bottling plant machinery. Again, such dirt and dust can possibly result in the introduction of contaminants into the beverage during bottling.

Unfortunately, much of the machinery used in the food and beverage packaging industry is relatively large and complex, and therefore often difficult to clean and maintain in a clean state. It is therefore advantageous to utilize machinery and parts therefor that are relatively easy to clean.

In connection with this application, the term "shaft" is used to also mean axles, guide rods or similar elements that execute a linear and/or rotating movement relative to the bearing system that is associated with it. For purposes of simplification, only the term "shaft" will be used, although this choice of terminology is in no way intended to restrict the scope of this application.

Bearing systems of this type for the bearing of rotating shafts are used, for example, in plain hydrostatic bearings that are made of ceramic materials for machine tools, in particular grinding machines, lathes etc. with strict requirements in terms of running precision, running speed or damping characteristics. For example, a plain hydrostatic bearing for machine tools has a support bushing and a bearing bushing, which is realized in the form of a complex, ring-shaped ceramic body with an outside surface that faces the support bushing and an inside surface that faces a shaft or spindle, and said inside surface has at least three rounded cavities to hold contact, lubricant or cooling media (DE 103 32 390 A1).

DE 195 26 497 A1 discloses a combined axial-radial plain bearing with ceramic bearing surfaces. Between these bearing surfaces, a recess is provided for the formation of a hydrodynamic lubricant wedge.

The components that are made of ceramic material are primarily realized only in the form of almost flat molded components, and therefore, in spite of their enormous advantages, can be used only to a limited extent in the area of contact between rotating and static components. Moreover, their rigidity is significantly limited, in particular with reference to the inevitable vibrations or displacements.

DE 23 56 817 A1 discloses a radial plain bearing for a shaft that rotates in one direction with a plurality of lubricant transport grooves in the bearing boring that run in the peripheral direction of the bearing or at a right angle to it and are connected with pressure pouches in the part of the bearing that holds the shaft. The bearing part is sealed externally by means of conical nipples. A realization of this type is unsuitable for the through-transport of media for cleaning or sterilization applications, for example, which is neither provided nor necessary in the prior art described above.

In certain industrial sectors such as the food, pharmaceutical or beverage industries, for example, there are very stringent requirements in terms of the cleaning or sterilization of machines and their components. These requirements are specified in certain countries in the form of specific legal standards or are required for certain product certifications such as those issued by the FDA, for example. These requirements relate in particular to sterile and clean room machines, as well as to bottling and packing machines or portions of a cold aseptic bottling operation.

OBJECT OR OBJECTS

The object of at least one possible embodiment, taking into consideration the evolving requirements in the industrial sectors cited above as well as current requirements and standards, is to realize a machine or device of this type so that essentially all the areas and problem zones at risk can be treated, cleaned or sterilized properly, without expecting any safety-relevant objections during continuous operation. A simultaneous object of at least one possible embodiment is an advantageous solution for the easy installation and replacement of the corresponding bearing elements.

SUMMARY

This application teaches that this object is accomplished in a bearing system according to at least one possible embodiment described herein.

With this configuration and in connection with the supplemental features disclosed herein and the realizations discussed in the description, a particularly advantageous construction is offered to accomplish the object of at least one possible embodiment. In particular, a constant and repeatable cleaning, and if necessary an expanded sterilization, of such machine components is possible. Moreover, an easy installation of the bearing bushing itself, as well as its replacement, is essentially guaranteed by the embodiment in which the bearing bushing has a longitudinal slot on the external surface thereof, and which bearing bushing can be varied in its inside and outside diameter by the gap width of the longitudinal slot and can be realized so that it can be rolled or coiled up.

Additional features and details of at least one possible embodiment will become apparent on the basis of the following description of preferred exemplary embodiments and with reference to the accompanying drawings. The features described and/or illustrated are all the objects of at least one possible embodiment, individually or in any suitable combination.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 3 is a longitudinal section of an installed bearing bushing;

FIG. 4 shows a suitable example of the use of a bearing bushing according to at least one possible embodiment;

DESCRIPTION OF EMBODIMENT OR EMBODIMENTS

Figure 1:
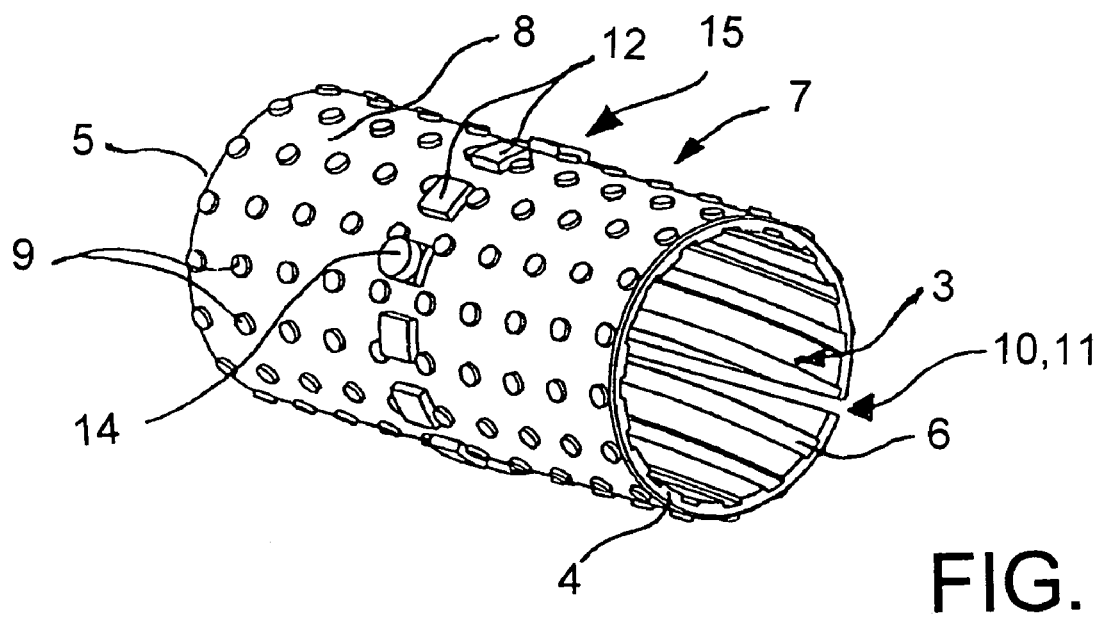
FIG. 1 is an isometric view of a bearing bushing according to at least one possible embodiment.
Figure 1A:
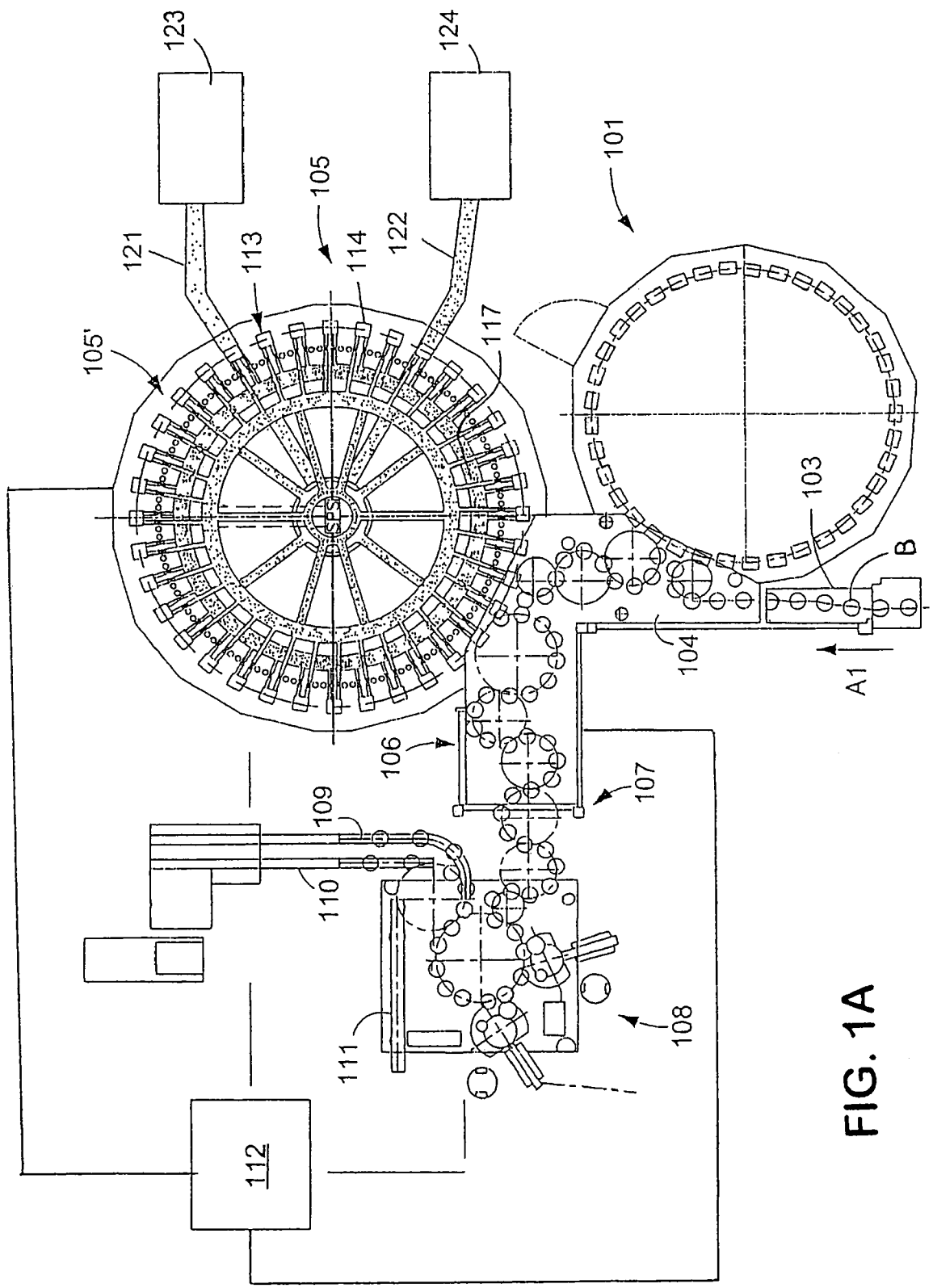
FIG. 1A shows a beverage bottling plant according to one possible embodiment.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 has three output conveyer arrangement: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The following portion of the description first makes reference to the bearing bushing 1, which is shown in an isometric illustration in FIG. 1. This bearing bushing, on its inner boring 3 that faces the bearing or guide shaft 2, has a plurality of groove-shaped recesses or channels 6 that run from one end side 4 to the opposite end side 5. On the outside cylindrical surface 8 that faces a bearing and receptacle boring 7, there are elevated portions 9 that preferably have a different shape. Regardless of this exemplary embodiment that is illustrated in FIG. 1, surfaces, elevations, recesses or channels 6, 9 that are shaped completely differently for the bearing contact with the bearing or guide shaft 2 and with the receptacle boring 7 can be provided with correspondingly different spaces. The essential factor is that these channels, surfaces and raised portions 6, 9 on one hand make possible the suitable bearing of the shaft 2 in accordance with the object of at least one possible embodiment and on the other hand an advantageous realization of the channels for the transport of and flushing with the cleaning and sterilization medium provided. It is advantageous if the recesses, elevations 6, 9 etc. that form canals are arranged so that a current that guides and controls the media can be produced, by means of which all the areas of such a bearing system that must be cleaned can be reached easily and reliably.

In the exemplary embodiment illustrated in FIG. 1, the channels 6 run parallel to one another in a spiral or helical shaped arrangement at an angle that can be selected as desired, whereby the distance between the recesses that are formed in this manner can be 5 mm, for example, or preferably 2 mm, taking into consideration the optimal bearing and cleaning characteristics. Such recesses and channels 6 that run in a spiral pattern can also be divided into a plurality of segments and distributed over the periphery, offset from one another. In that case, the offset is bridged by connecting channels and guide channels. In this manner, the rinsing medium can be forcibly guided for at least one full revolution around the associated bearing shaft 2 or through the bearing system. In the manufacture of a bearing bushing 1 of this type in the form of an injection-molded part, the inner and outer elevated portions can run at the same circulating angle or can be raised or recessed to facilitate the unmolding process.

The diameter of the bearing bushing 1 is variable with respect to the final installed diameter, to facilitate the installation process. For this purpose, the bearing bushing 1, on the external cylindrical surface, for example, can have a longitudinal slot 10, by the width 11 of which it can be compressed, and its diameter can be reduced correspondingly so that it can be inserted into the receptacle boring 7. It is also conceivable to roll or curl up the bearing bushing 1 for purposes of insertion and removal.

Figure 2:
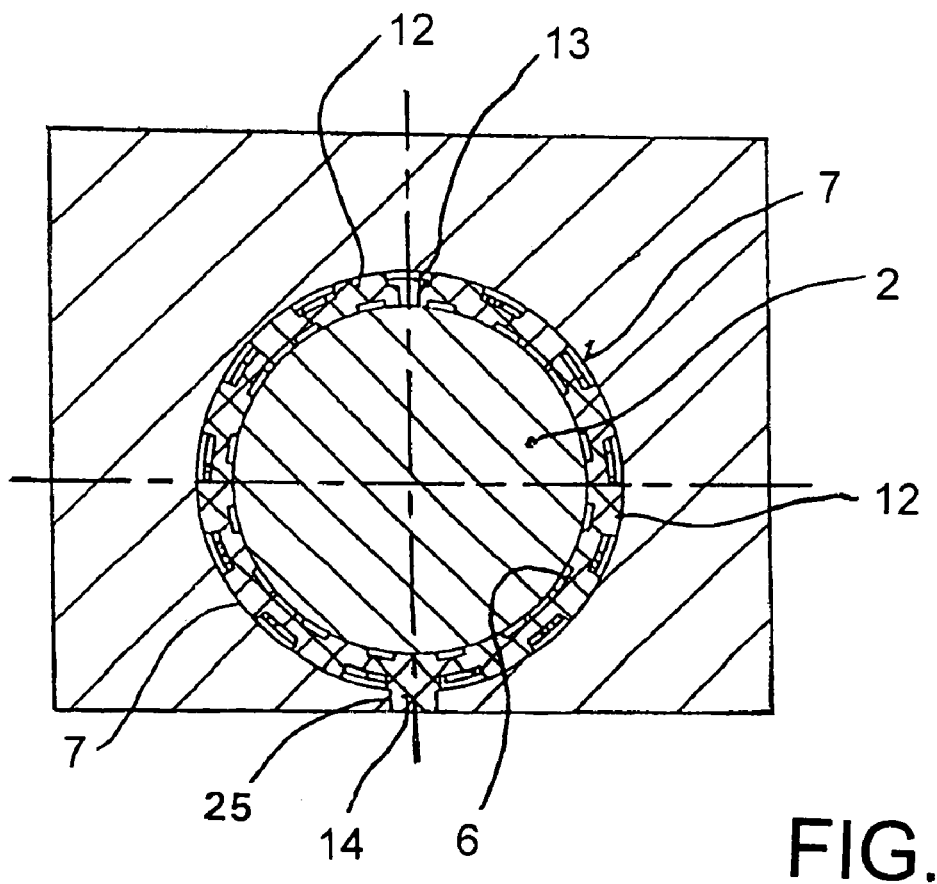
FIG. 2 is a cross section through a bearing busing inserted in a bearing housing.

FIGS. 1 to 3 show that to hold the bearing bushing 1 in its axial position, on its external cylindrical surface 8 there are a plurality of elevations 12 in the shape of rectangular blocks which engage in a preferably encircling annular groove 13 in the receptacle boring 7 and ensure that the bearing bushing 1 is held securely in position. Furthermore, at least one additional elevation 14 is provided to secure the bushing radially. This additional elevation 14 is advantageously realized in the form of a cylinder or pin and can be introduced into a locking boring 25 in the receptacle boring 7. The elevations 12, 14 are preferably located jointly on a common radial surface 15 on the periphery.

FIG. 4 illustrates one suitable example of the application of the example with a capping machine 16, only part of which is shown, for the capping of filled containers 17. In each capping position, a container or bottle holder 18 is provided to center and support a container 17 that is oriented with its vertical axis parallel to the axis of rotation of the capping machine 16. Above the bottle holder 18, a special screw shaft set 20 is also provided, which among other things has a screw shaft 21 that runs vertically and has a screw head 22 on the bottom.

During the rotation of the capping machine 16, each bottle holder 18 and thus also the associated container 17 executes a controlled vertical reciprocating motion, so that from each screw head 22, a screw cap (not shown) is picked up, then the screw cap is moved toward the mouth of the container, where it is screwed onto the container by the rotation of the screw shaft 21 and tightened to a suitable torque. In the bottle holder 18 or its bearing system 23, a bearing bushing 1 having the characteristics described above is preferably incorporated, which can be cleaned and sterilized when it becomes dirty or contaminated or at specified intervals. For this purpose, all suitable cleaning media can be used, such as cleaning and sterilization foams and similar products.

Figure 4A:
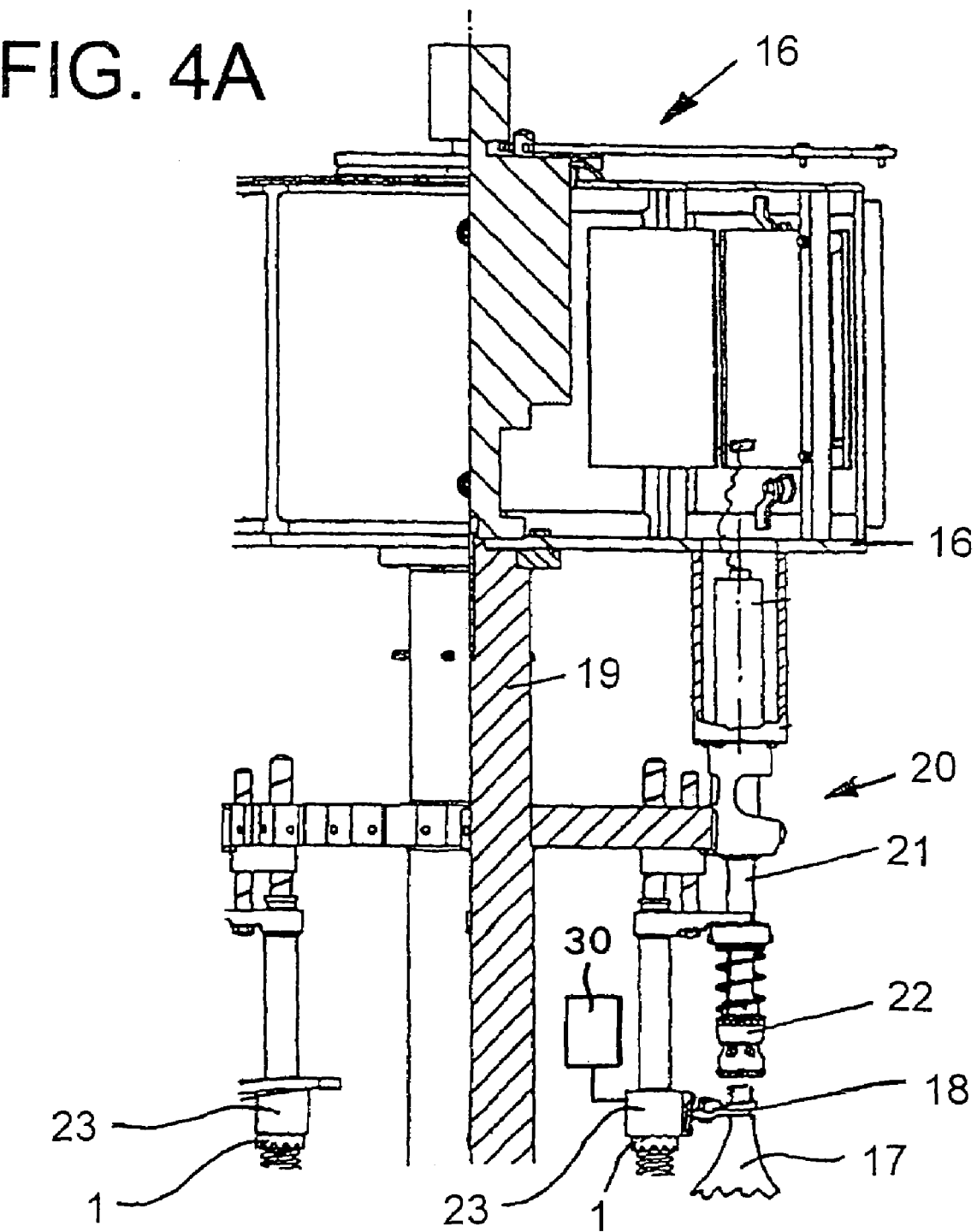
FIG. 4A shows another view of the embodiment shown in FIG. 4 with additional features.

FIG. 4A shows the view in FIG. 4 with additional features. FIG. 4A shows a cleaning system or device 30 that, according to at least one possible embodiment, supplies a cleaning medium to the bearing system 23 to clean the bearing system 23. The cleaning system 30 can be either manually or automatically operated, and can utilize any one or more of several possible methods to supply cleaning medium to the bearing system 23, such as by injecting or spraying the cleaning medium, which can be in the form of liquid or foam, for example.

It of course should be understood that the above-described bearing bushing 1, in at least one possible embodiment, can be utilized in any machine in a beverage bottling or container filling plant that employs a reciprocating or axially-movable shaft, such as a filling or labeling machine, for example.

One feature or aspect of an embodiment is believed at the time of the filing of this patent application to possibly reside broadly in a bearing system for the bearing of a shaft with a bearing sleeve that can be inserted into a receptacle boring of a machine or sliding component, support bearing and similar components, whereby recesses are provided at least in the receptacle boring for the feed and discharge of media, characterized in that the bearing bushing 1, on its inner boring 3 that faces the bearing and/or guide shaft 2, has a plurality of recesses 6 running from end side 4 to end side 5, and on the outside cylindrical surface 8 facing the bearing boring 7 a plurality of elevations 9, whereby at least some 12, 14 of these elevations are realized for the radial and axial securing of the bearing bushing 1.

Another feature or aspect of an embodiment is believed at the time of the filing of this patent application to possibly reside broadly in the bearing system, characterized in that the bearing bushing 1 has variously arranged and oriented surfaces/elevations 6, 9 for the bearing contact with the shaft 2 and the bearing boring 7, and spaces between the surfaces/elevations 6, 9, whereby the spaces, with the shaft 2 and the cylindrical surface of the receptacle and bearing boring 7, form channels for the through-transport of cleaning and sterilization medium.

Yet another feature or aspect of an embodiment is believed at the time of the filing of this patent application to possibly reside broadly in the bearing system, characterized in that the diameter of the bearing bushing 1 is variable with respect to its final installed diameter, to facilitate its insertion and removal.

Still another feature or aspect of an embodiment is believed at the time of the filing of this patent application to possibly reside broadly in the bearing system, characterized in that the bearing bushing 1 has a longitudinal slot 10 on the external surface.

A further feature or aspect of an embodiment is believed at the time of the filing of this patent application to possibly reside broadly in the bearing system, characterized in that the bearing bushing 1 can be varied in its inside and outside diameter by the gap width 11 of a longitudinal slot 10.

Another feature or aspect of an embodiment is believed at the time of the filing of this patent application to possibly reside broadly in the bearing system, characterized in that the bearing bushing 1 is realized so that it can be rolled or coiled up.

Yet another feature or aspect of an embodiment is believed at the time of the filing of this patent application to possibly reside broadly in the bearing system, characterized in that groove-shaped recesses 6 are realized at least partly around the external cylindrical surface of the shaft/guide rod 2 to transport and guide media.

Still another feature or aspect of an embodiment is believed at the time of the filing of this patent application to possibly reside broadly in the bearing system, characterized in that the groove-shaped recesses 6 run in a spiral pattern.

A further feature or aspect of an embodiment is believed at the time of the filing of this patent application to possibly reside broadly in the bearing system, characterized in that the recesses and/or grooves 6 that run in a spiral pattern on the inner cylindrical surface of the bearing bushing 1 are divided into a plurality of segments and are connected to one another by guide channels, whereby the spiral-shaped segments are offset from one another so that the rinsing medium is forced to travel at least one complete rotation around the associated bearing shaft.

Another feature or aspect of an embodiment is believed at the time of the filing of this patent application to possibly reside broadly in the bearing system, characterized in that the individual recesses, grooves 6 etc. run parallel or at an angle to the bearing axis.

Yet another feature or aspect of an embodiment is believed at the time of the filing of this patent application to possibly reside broadly in the bearing system, characterized in that the distance between the recesses 6 is a maximum of 5 mm, and preferably 2 mm.

A further feature or aspect of an embodiment is believed at the time of the filing of this patent application to possibly reside broadly in the bearing system, characterized in that some of the elevations 12 are engaged in a groove 13 that at least partly encircles the receptacle boring 7 to fix the bearing bushing 1 in position axially.

Another feature or aspect of an embodiment is believed at the time of the filing of this patent application to possibly reside broadly in the bearing system, characterized in that some of the elevations 14 are engaged in openings in the receptacle boring 7 to fix the bearing bushing 1 in position radially.

Yet another feature or aspect of an embodiment is believed at the time of the filing of this patent application to possibly reside broadly in a beverage bottling plant for filling bottles with a liquid beverage, said beverage bottling plant comprising: a bottle filling machine being configured and disposed to fill bottles with a liquid beverage; a first conveyor arrangement being configured and disposed to convey bottles to be filled to said bottle filling machine; said bottle filling machine comprising: a rotor; a rotatable vertical machine column; said rotor being connected to said vertical machine column to permit rotation of said rotor about said vertical machine column; a plurality of bottle filling elements for filling bottles with liquid beverage being disposed on the periphery of said rotor; each of said plurality of bottle filling elements comprising a bottle carrier being configured and disposed to receive and hold bottles to be filled; each of said plurality of bottle filling elements being configured and disposed to dispense liquid beverage into bottles to be filled; at least one liquid beverage reservoir being configured to hold a supply of liquid beverage; at least one supply line being configured and disposed to connect said at least one liquid beverage reservoir to said bottle filling machine to supply liquid beverage to said bottle filling machine; a first star wheel structure being configured and disposed to move bottles into said bottle filling machine; a second star wheel structure being configured and disposed to move bottles out of said bottle filling machine; and at least one reciprocating shaft arrangement being configured and disposed to raise said bottle carriers to move bottles to a position adjacent said bottle filling elements to permit dispensing of liquid beverage into the bottles, and being configured and disposed to lower said bottle carriers to move the filled bottles to a position away from said bottle filling elements upon filling of the bottles; and a bottle closing machine being configured and disposed to close tops of filled bottles; a second conveyor arrangement being configured and disposed to convey filled bottles from said bottle filling machine to said bottle closing machine; said bottle closing machine comprising: a rotor; a rotatable vertical machine column; said rotor being connected to said vertical machine column to permit rotation of said rotor about said vertical machine column; a plurality of closing devices being disposed on the periphery of said rotor; each of said plurality of closing devices being configured and disposed to place closures on filled bottles; each of said plurality of closing devices comprising a bottle carrier being configured and disposed to receive and hold filled bottles; a first star wheel structure being configured and disposed to move filled bottles into said bottle closing machine; a second star wheel structure being configured and disposed to move filled, closed bottles out of said bottle closing machine; and at least one reciprocating shaft arrangement being configured and disposed to raise said bottle carriers to move filled bottles to a position adjacent said closing devices to permit placement of closures on the filled bottles, and being configured and disposed to lower said bottle carriers to move the filled bottles to a position away from said closing devices upon placement of closures on the filled bottles; and said at least one reciprocating shaft arrangements of said filling machine and said closing machine each comprising a bearing system for the bearing of a shaft with a bearing sleeve that can be inserted into a receptacle boring of a machine or sliding component, support bearing and similar components, whereby recesses are provided at least in the receptacle boring for the feed and discharge of media, wherein the bearing bushing, on its inner boring that faces the bearing and/or guide shaft, has a plurality of recesses running from end side to end side, and on the outside cylindrical surface facing the bearing boring a plurality of elevations, whereby at least some of these elevations are realized for the radial and axial securing of the bearing bushing.

Still another feature or aspect of an embodiment is believed at the time of the filing of this patent application to possibly reside broadly in a container filling plant for filling containers with a liquid, said container filling plant comprising: a container filling machine being configured and disposed to fill containers with a liquid; a first conveyor arrangement being configured and disposed to convey containers to be filled to said container filling machine; said container filling machine comprising: a rotor; a rotatable vertical machine column; said rotor being connected to said vertical machine column to permit rotation of said rotor about said vertical machine column; a plurality of container filling elements for filling containers with liquid being disposed on the periphery of said rotor; each of said plurality of container filling elements comprising a container carrier being configured and disposed to receive and hold containers to be filled; each of said plurality of container filling elements being configured and disposed to dispense liquid into containers to be filled; at least one liquid reservoir being configured to hold a supply of liquid; at least one supply line being configured and disposed to connect said at least one liquid reservoir to said container filling machine to supply liquid to said container filling machine; a first star wheel structure being configured and disposed to move containers into said container filling machine; a second star wheel structure being configured and disposed to move containers out of said container filling machine; and at least one reciprocating shaft arrangement being configured and disposed to raise said container carriers to move containers to a position adjacent said container filling elements to permit dispensing of liquid into the containers, and being configured and disposed to lower said container carriers to move the filled containers to a position away from said container filling elements upon filling of the containers; and a container closing machine being configured and disposed to close tops of filled containers; a second conveyor arrangement being configured and disposed to convey filled containers from said container filling machine to said container closing machine; said container closing machine comprising: a rotor; a rotatable vertical machine column; said rotor being connected to said vertical machine column to permit rotation of said rotor about said vertical machine column; a plurality of closing devices being disposed on the periphery of said rotor; each of said plurality of closing devices being configured and disposed to place closures on filled containers; each of said plurality of closing devices comprising a container carrier being configured and disposed to receive and hold filled containers; a first star wheel structure being configured and disposed to move filled containers into said container closing machine; a second star wheel structure being configured and disposed to move filled, closed containers out of said container closing machine; and at least one reciprocating shaft arrangement being configured and disposed to raise said container carriers to move filled containers to a position adjacent said closing devices to permit placement of closures on the filled containers, and being configured and disposed to lower said container carriers to move the filled containers to a position away from said closing devices upon placement of closures on the filled containers; and at least one of said at least one reciprocating shaft arrangements of said filling machine and said closing machine comprising a bearing system for the bearing of a shaft with a bearing sleeve that can be inserted into a receptacle boring of a machine or sliding component, support bearing and similar components, whereby recesses are provided at least in the receptacle boring for the feed and discharge of media, wherein the bearing bushing, on its inner boring that faces the bearing and/or guide shaft, has a plurality of recesses running from end side to end side, and on the outside cylindrical surface facing the bearing boring a plurality of elevations, whereby at least some of these elevations are realized for the radial and axial securing of the bearing bushing.

At least one possible embodiment of the invention relates to a bearing system for the bearing of a shaft with a bearing sleeve that can be inserted into a receptacle boring of a machine or sliding component, support bearing and similar components, whereby recesses are provided at least in the receptacle boring for the feed and discharge of media. To improve the cleaning and/or sterilization of such bearing systems, the invention teaches that the bearing bushing, on its inner boring that faces the bearing and/or guide shaft, has a plurality of recesses running from one end side to the other end side, and on the outside cylindrical surface facing the bearing boring has a plurality of elevations, whereby at least some of these elevations are realized for the radial and axial securing of the bearing bushing.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of bottling systems, which may be used or adapted for use in at least one possible embodiment of the present may be found in the following U.S. patents assigned to the Assignee herein, namely: U.S. Pat. Nos. 4,911,285; 4,944,830; 4,950,35; 4,976,803; 4,981,547; 5,004,518; 5,017,261; 5,062,917; 5,062,918; 5,075,123; 5,078,826; 5,087,317; 5,110,402; 5,129,984; 5,167,755; 5,174,851; 5,185,053; 5,217,538; 5,227,005; 5,413,153; 5,558,138; 5,634,500; 5,713,403; 6,276,113; 6,213,169; 6,189,578; 6,192,946; 6,374,575; 6,365,054; 6,619,016; 6,474,368; 6,494,238; 6,470,922; and 6,463,964.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of methods and apparatuses for closing bottles and containers and their components that may possibly be utilized or possibly adapted for use in at least one possible embodiment of the present may possibly be found in the following U.S. patents: U.S. Pat. No. 5,398,485 issued to Osifchin on Mar. 21, 1995; U.S. Pat. No. 5,402,623 issued to Ahlers on Apr. 4, 1995; U.S. Pat. No. 5,419,094 issued to Vander Bush, Jr. et al. on May 30, 1995; U.S. Pat. No. 5,425, 402 issued to Pringle on Jun. 20, 1995; U.S. Pat. No. 5,447, 246 issued to Finke on Sep. 5, 1995; and U.S. Pat. No. 5,449, 080 issued to Finke on Sep. 12, 1995.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of apparatus and methods of sterilizing or cleaning containers that may possibly be utilized or possibly adapted for use in at least one possible embodiment of the present application may possibly be found in the following U.S. patents: U.S. Pat. No. 5,092,356 issued to Grot on Mar. 3, 1992; U.S. Pat. No. 5,320,144 issued to Ahlers on Jun. 14, 1994; U.S. Pat. No. 5,533,552 issued to Ahlers on Jul. 9, 1996; U.S. Pat. No. 5,558,135 issued to Kronseder et al. on Sep. 24, 1996; and U.S. Pat. No. 5,896,899 issued to Schlitz on Apr. 27, 1999.

All of the patents, patent applications and publications recited herein, and in the Declaration attached hereto, are hereby incorporated by reference as if set forth in their entirety herein.

Some examples of sterilizing or cleaning agents and concentrations thereof that may possibly be utilized or possibly adapted for use in at least one possible embodiment of the present application may possibly be found in the following U.S. patents: U.S. Pat. No. 6,039,922 issued to Swank et al. on Mar. 21, 2000; U.S. Pat. No. 6,244,275 issued to Ziegler et al. on Jun. 12, 2001; U.S. Pat. No. 6,406,666 issued to Cicla et al. on Jun. 18, 2002; and U.S. Pat. No. 6,612,149 issued to Wang et al. on Sep. 2, 2003.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner. It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the search report for the corresponding German Application No. 10 2005 023.575.1, filed on May 19, 2005, and/or cited elsewhere are hereby incorporated by reference as if set forth in their entirety herein as follows: JP 61-13 019 A; U.S. Pat. No. 5,836,699 A; DE 101 24 831A1; DE 23 47 548 A1; DE 86 19 907 U1; U.S. Pat. No. 2,931,412; DE 30 21 533 A1; DE 596 173 C; DE 37 43 086 A1; FR 13 10 614; GB 1 174 660; EP 0 141 003 A1; CH 492 140; US 2004 0057 643 A1; and DE 695 28 884 T2.

The corresponding foreign and international patent publication application, namely, Federal Republic of Germany Patent Application No. 10 2005 023.575.1, filed on May 19, 2005, having inventor Herbert Bernhard, is hereby incorporated by reference as if set forth in its entirety herein for the purpose of correcting and explaining any possible misinterpretations of the English translation thereof. In addition, the published equivalents of the above corresponding foreign patent application, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of bottling and container handling systems and components thereof which may possibly be utilized or adapted for use in at least one possible embodiment, may possibly be found in the following U.S. patents: U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" and U.S. Pat. No. 6,668,877, entitled "Filling System for Still Beverages."

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of operating and cleaning at least a portion of a container closing machine in a contaminatable environment to remove or minimize the presence of contaminants in said at least a portion of said closing machine, said closing machine comprising: at least one closing arrangement for placing closures on containers filled with a product; said at least one closing arrangement comprising: at least one shaft arrangement comprising a shaft and a bearing arrangement to guide said shaft; a container holding structure being configured to hold a container during closing and being connected to said at least one shaft arrangement to permit raising and lowering of said holding structure; a closure applicator being configured and disposed to apply closures to the open tops of filled containers; said bearing arrangement comprising: a bearing housing comprising an opening; said bearing housing being configured to be moved up and down to raise and lower said holding structure connected thereto; a bearing sleeve being inserted into and retained in said opening in said bearing housing; said bearing sleeve being configured and disposed to receive said shaft; said bearing housing being configured to permit the feed and discharge of cleaning media into and out of said bearing housing; said bearing sleeve comprising an exterior surface being disposed to face an interior surface of said opening in said bearing housing; said bearing sleeve comprising an interior surface being disposed about and to face said shaft in said bearing sleeve; said interior surface of said bearing sleeve comprising a plurality of recesses being disposed substantially along the length of said bearing sleeve; said exterior surface of said bearing sleeve comprising a plurality of projections; and at least a portion of said projections being configured to secure said bearing sleeve against radial or axial movement in said bearing housing; said method comprising the steps of:

operating said closing machine and introducing contaminants or contaminatable material onto said shaft and into said bearing arrangement, said step of operating comprising:

moving filled containers into said closing machine and holding a filled container with said holding structure;

moving said bearing housing in an upwards movement to raise said holding structure and the filled container held thereby into a position adjacent said closure applicator;

closing the open top of the filled container with said closure applicator by placing a closure on the open top of the filled container;

moving said bearing housing in a downwards movement to lower said holding structure and the closed container held thereby into a position to be moved out of said closing machine;

cleaning said bearing arrangement to remove or minimize the presence of contaminants in or on said at least one shaft arrangement to minimize the presence of contaminants on or in the filled containers and thus to minimize contamination of the product in the filled containers, said step of cleaning comprising:

supplying cleaning medium into said bearing housing;

conducting said cleaning medium through said plurality of recesses of said interior surface of said bearing sleeve to clean the interior surface of said bearing sleeve and at least a portion of said shaft; and conducting said cleaning medium in between said plurality of projections of said exterior surface of said bearing sleeve to clean the exterior surface of said bearing sleeve and the interior surface of said opening in said bearing housing.

2. The method according to claim 1, wherein said container closing machine comprises a bottle closing machine, and the diameter of the bearing sleeve is variable with respect to its final installed diameter to facilitate its insertion and removal.

3. The method according to claim 2, wherein:

the bearing sleeve has a longitudinal slot on the external surface thereof; and the bearing sleeve can be varied in its inside and outside diameter by the gap width of the longitudinal slot.

4. The method according to claim 3, wherein:

the bearing sleeve is realized so that it can be rolled or coiled up; and said recesses run in a spiral pattern on the inner cylindrical surface of the bearing sleeve and are divided into a plurality of segments and are connected to one another by guide channels, whereby the spiral-shaped segments are offset from one another so that the cleaning medium is forced to travel at least one complete rotation around the shaft.

5. The method according to claim 4, wherein:

the distance between the recesses is a maximum of 5 mm; and some of the projections are engaged in a groove that runs at least partly around the interior of the bearing housing to fix the bearing sleeve in position axially.

6. The method according to claim 5, wherein:

the distance between the recesses is 2 mm; and some of the projections are engaged in openings in the bearing housing to fix the bearing sleeve in position radially.

7. A method of operating and cleaning at least a portion of a container closing machine in a contaminatable environment to remove or minimize the presence of contaminants in said at least a portion of said closing machine, said closing machine comprising: at least one closing arrangement for placing closures on containers filled with a product; said at least one closing arrangement comprising: at least one shaft arrangement comprising a shaft and a bearing arrangement to guide said shaft; a container holding structure being configured to hold a container during closing and being operatively connected to said at least one shaft arrangement to permit raising and lowering of said holding structure; a closure applicator being configured and disposed to apply closures to the open tops of filled containers; said bearing arrangement comprising: a bearing housing comprising an opening; a bearing sleeve being inserted into and retained in said opening in said bearing housing; said bearing sleeve being configured and disposed to receive said shaft; said bearing housing being configured to permit the feed and discharge of cleaning media into and out of said bearing housing; said bearing sleeve comprising an exterior surface being disposed to face an interior surface of said opening in said bearing housing; said bearing sleeve comprising an interior surface being disposed about and to face said shaft in said bearing sleeve; said interior surface of said bearing sleeve comprising a plurality of recesses being disposed substantially along the length of said bearing sleeve; said exterior surface of said bearing sleeve comprising a plurality of projections; and at least a portion of said projections being configured to secure said bearing sleeve against radial or axial movement in said bearing housing; said method comprising the steps of:

operating said closing machine and introducing contaminants or contaminatable material onto said shaft and into said bearing arrangement, said step of operating comprising:

moving filled containers into said closing machine and holding a filled container with said holding structure;

raising said holding structure and the filled container held thereby into a position to be closed;

closing the open top of the filled container with said closure applicator;

lowering said holding structure and the closed container held thereby into a position to be moved out of said closing machine;

cleaning said bearing arrangement to remove or minimize the presence of contaminants in or on said at least one shaft arrangement to minimize the presence of contaminants on or in the filled containers and thus to minimize contamination of the product in the filled containers, said step of cleaning comprising:

supplying cleaning medium into said bearing housing;

conducting said cleaning medium through said plurality of recesses of said interior surface of said bearing sleeve to clean the interior surface of said bearing sleeve and at least a portion of said shaft; and conducting said cleaning medium in between said plurality of projections of said exterior surface of said bearing sleeve to clean the exterior surface of said bearing sleeve and the interior surface of said opening in said bearing housing.

8. The method according to claim 7, wherein the diameter of the bearing sleeve is variable with respect to its final installed diameter to facilitate its insertion and removal.

9. The method according to claim 8, wherein:
the bearing sleeve has a longitudinal slot on the external surface thereof; and
the bearing sleeve can be varied in its inside and outside diameter by the gap width of the longitudinal slot.

10. The method according to claim 9, wherein:
said container closing machine comprises a bottle closing machine;
the bearing sleeve is realized so that it can be rolled or coiled up; and
said recesses run in a spiral pattern on the inner cylindrical surface of the bearing sleeve and are divided into a plurality of segments and are connected to one another by guide channels, whereby the spiral-shaped segments are offset from one another so that the cleaning medium is forced to travel at least one complete rotation around the shaft.

11. The method according to claim 10, wherein:
the distance between the recesses is a maximum of 5 mm; and
some of the projections are engaged in a groove that runs at least partly around the interior of the bearing housing to fix the bearing sleeve in position axially.

12. The method according to claim 11, wherein:
the distance between the recesses is 2 mm; and
some of the projections are engaged in openings in the bearing housing to fix the bearing sleeve in position radially.

13. A method of operating and cleaning at least a portion of a container closing machine in a contaminatable environment to remove or minimize the presence of contaminants in said at least a portion of said closing machine, said closing machine comprising: at least one closing arrangement for placing closures on containers filled with a product; said at least one closing arrangement comprising: at least one shaft arrangement comprising a shaft and a bearing arrangement to guide said shaft; a container holding structure being configured to hold a container during closing and being operatively connected to said at least one shaft arrangement to permit raising and lowering of said holding structure; a closure applicator being configured and disposed to apply closures to the open tops of filled containers; said bearing arrangement comprising: a bearing housing comprising an opening; a bearing sleeve being inserted into and retained in said opening in said bearing housing; said bearing sleeve being configured and disposed to receive said shaft; said bearing housing being configured to permit the feed and discharge of cleaning media into and out of said bearing housing; said bearing sleeve comprising an exterior surface being disposed to face an interior surface of said opening in said bearing housing; said bearing sleeve comprising an interior surface being disposed about and to face said shaft in said bearing sleeve; said interior surface of said bearing sleeve comprising a plurality of projections; and said exterior surface of said bearing sleeve comprising a plurality of projections; said method comprising the steps of:

operating said closing machine and introducing contaminants or contaminatable material onto said shaft and into said bearing arrangement, said step of operating comprising:

moving filled containers into said closing machine and holding a filled container with said holding structure;

raising said holding structure and the filled container held thereby into a position to be closed;

closing the open top of the filled container with said closure applicator;

lowering said holding structure and the closed container held thereby into a position to be moved out of said closing machine;

cleaning said bearing arrangement to remove or minimize the presence of contaminants in or on said at least one shaft arrangement to minimize the presence of contaminants on or in the filled containers and thus to minimize contamination of the product in the filled containers, said step of cleaning comprising:

supplying cleaning medium into said bearing housing;

conducting said cleaning medium in between said plurality of projections of said interior surface of said bearing sleeve to clean the interior surface of said bearing sleeve and at least a portion of said shaft; and conducting said cleaning medium in between said plurality of projections of said exterior surface of said bearing sleeve to clean the exterior surface of said bearing sleeve and the interior surface of said opening in said bearing housing.

14. The method according to claim 13, wherein the diameter of the bearing sleeve is variable with respect to its final installed diameter to facilitate its insertion and removal.

15. The method according to claim 14, wherein the bearing sleeve has a longitudinal slot on the external surface thereof.

16. The method according to claim 15, wherein the bearing sleeve can be varied in its inside and outside diameter by the gap width of the longitudinal slot.

17. The method according to claim 16, wherein:

said container closing machine comprises a bottle closing machine; and the bearing sleeve is realized so that it can be rolled or coiled up.

18. The method according to claim 17, wherein:

said inner cylindrical surface of said bearing sleeve comprises recesses disposed between said projections; and said recesses are disposed run in a spiral pattern on the inner cylindrical surface of the bearing sleeve and are divided into a plurality of segments and are connected to one another by guide channels, whereby the spiral-shaped segments are offset from one another so that the cleaning medium is forced to travel at least one complete rotation around the shaft.

19. The method according to claim 18, wherein:

the distance between the recesses is a maximum of 5 mm; and some of the projections of the exterior surface of said bearing sleeve are engaged in a groove that runs at least partly around the interior of the bearing housing to fix the bearing sleeve in position axially.

20. The method according to claim 19, wherein:

the distance between the recesses is 2 mm; and some of the projections of the exterior surface of said bearing sleeve are engaged in openings in the bearing housing to fix the bearing sleeve in position radially.

* * * * *